(12) United States Patent
Garbutt et al.

(10) Patent No.: US 10,821,926 B2
(45) Date of Patent: Nov. 3, 2020

(54) BUMPER ASSEMBLY AND A BUMPER SYSTEM AT A FRONT OF A TRUCK

(71) Applicant: Ford Global Technologies LLC, Dearborn, MI (US)

(72) Inventors: Jason Garbutt, Melbourne (AU); Seth Larris, Coburg (AU); Keong Fook Yip, Canterbury (AU); Brendon Glennie, Coburg (AU); David Job, Viewbank (AU); Hieu duc Nguyen, Melbourne (AU)

(73) Assignee: Ford Global Technologies LLC, Dearborn, MI (US)

( * ) Notice: Subject to any disclaimer, the term of this patent is extended or adjusted under 35 U.S.C. 154(b) by 128 days.

(21) Appl. No.: 16/251,985

(22) Filed: Jan. 18, 2019

(65) Prior Publication Data

US 2019/0248313 A1    Aug. 15, 2019

(30) Foreign Application Priority Data

Feb. 9, 2018    (CN) ........................... 2018 1 0132909

(51) Int. Cl.
| | |
|---|---|
| *B60R 19/34* | (2006.01) |
| *B60R 19/18* | (2006.01) |
| *B60R 21/34* | (2011.01) |
| *B60R 19/12* | (2006.01) |

(52) U.S. Cl.
CPC ............. *B60R 19/34* (2013.01); *B60R 19/18* (2013.01); *B60R 19/12* (2013.01); *B60R 21/34* (2013.01)

(58) Field of Classification Search
CPC .......... B60R 19/34; B60R 19/04; B60R 19/18

USPC ........................................ 293/120, 133, 102
See application file for complete search history.

(56) References Cited

U.S. PATENT DOCUMENTS

| | | | |
|---|---|---|---|
| 6,634,702 B1 * | 10/2003 | Pleschke ................. | B60R 19/18 293/102 |
| 6,709,036 B1 * | 3/2004 | Evans ...................... | B60D 1/52 224/521 |
| 8,167,361 B2 | 5/2012 | Riviere et al. | |
| 8,480,143 B2 | 7/2013 | Huang et al. | |
| 8,876,179 B2 | 11/2014 | Nagwanshi et al. | |
| 8,973,957 B2 | 3/2015 | Corwin et al. | |

(Continued)

FOREIGN PATENT DOCUMENTS

WO    2015153547 A1    10/2015

OTHER PUBLICATIONS

EU Ped.-Pro. & Part 581 Compliant Energy Absorber—Dec. 12, 2014 https://plasticscar.blogspot.in/2014/12/eu-ped-pro-part-581-compliant-energy.html.

(Continued)

*Primary Examiner* — Jason S Morrow
(74) *Attorney, Agent, or Firm* — David Coppiellie; Kolitch Romano LLP

(57) ABSTRACT

The present application provides a bumper assembly to be connected to a chassis bumper beam at a front of a vehicle. The bumper assembly comprises a plastic fascia; a metal reinforcement member; and a plastic reinforcement member disposed between the plastic fascia and the metal reinforcement member and connected with the plastic fascia and the metal reinforcement member. The plastic fascia, the plastic reinforcement member and the metal reinforcement member extend at a lateral direction of the vehicle.

18 Claims, 6 Drawing Sheets

(56) References Cited

U.S. PATENT DOCUMENTS

| | | | | |
|---|---|---|---|---|
| 2003/0227184 A1* | 12/2003 | Evans | | B60D 1/56 |
| | | | | 293/120 |
| 2006/0214439 A1* | 9/2006 | Reynolds | | B60R 19/18 |
| | | | | 293/132 |
| 2006/0255602 A1* | 11/2006 | Evans | | B60R 19/18 |
| | | | | 293/120 |
| 2007/0182172 A1* | 8/2007 | Hasegawa | | B60R 19/18 |
| | | | | 293/102 |
| 2010/0127533 A1* | 5/2010 | Gonin | | B60R 19/18 |
| | | | | 296/193.09 |
| 2010/0253102 A1* | 10/2010 | Riviere | | B62D 21/152 |
| | | | | 293/121 |
| 2011/0109105 A1* | 5/2011 | Ralston | | B60R 19/18 |
| | | | | 293/132 |
| 2011/0221213 A1* | 9/2011 | Riviere | | B62D 25/084 |
| | | | | 293/132 |
| 2012/0104778 A1* | 5/2012 | Mana | | B60R 19/18 |
| | | | | 293/133 |
| 2015/0015005 A1* | 1/2015 | Shin | | B60R 19/24 |
| | | | | 293/120 |
| 2015/0151698 A1* | 6/2015 | Lee | | B60R 19/24 |
| | | | | 293/120 |
| 2016/0121827 A1* | 5/2016 | Yabu | | B60R 19/18 |
| | | | | 293/120 |
| 2016/0257271 A1* | 9/2016 | Tomita | | B60R 19/18 |
| 2018/0141512 A1* | 5/2018 | Munjurulimana | | B60R 19/18 |
| 2018/0304839 A1* | 10/2018 | Shenaq | | B60R 19/52 |

OTHER PUBLICATIONS

Sabic Innovative Plastics Continues Collaboration with Hyundai with New I10 Energy Absorbers for Improved Pedestrian Safety—Mar. 19, 2009 https://www.sabic-ip.com/gep/en/NewsRoom/PressReleasePrint/march_19_2009_sabicinnovativeplasticscontinues.html.

* cited by examiner

BUMPER ASSEMBLY AND A BUMPER SYSTEM AT A FRONT OF A TRUCK

RELATED APPLICATION

This application claims the benefit of Chinese Patent Application No.: CN 201810132909.0 filed on Feb. 9, 2018, the entire contents thereof being incorporated herein by reference.

FIELD

The present application relates generally to a bumper assembly and a bumper system at a front of a truck.

BACKGROUND

There are two types of vehicle chassis, i.e., an unibody chassis and a body-on-frame chassis. For the unibody chassis, the body of the vehicle is designed and built to support the weight of the vehicle and perform any other functions of a chassis, which is achieved by strengthening the floor of the vehicle, the pillars and using bracing along various parts of the body. The unibody chassis is used in most vehicle types such as passenger vehicles, luxury vehicles or sport oriented vehicles. For the body-on-frame chassis or a ladder chassis, the body of the vehicle is mounted to a separate frame or chassis. This frame is similar to a ladder in design as two long pieces of steel (e.g., the pieces with an approximate length of the vehicle) are held parallel to each other by shorter pieces running across. The ladder chassis is typically used for the trucks, and vehicles for commercial and heavy-duty work.

For a truck, a front bumper is usually a steel bumper to provide sufficient rigidity. However, the steel bumper may not have suitable energy absorption to meet the pedestrian safety performance required in some markets or jurisdictions. There is a need for a bumper system that meets the requirements for crash performance, vehicle durability performance and customer firmness feel while is compliant with pedestrian safety performance regulations in some markets and jurisdiction.

SUMMARY

According to one aspect, the present disclosure provides a bumper assembly to be connected at a front of a vehicle. The bumper system comprises a plastic fascia; a metal reinforcement member; and a plastic reinforcement member disposed between the plastic fascia and the metal reinforcement member and connected with the plastic fascia and the metal reinforcement member. The plastic fascia, the plastic reinforcement member and the metal reinforcement member extend at a lateral direction of the vehicle.

In one embodiment, the bumper assembly may further comprise a plastic absorber disposed between the plastic fascia and the plastic reinforcement member. The plastic absorber is connected to the plastic reinforcement member.

In another embodiment, the metal reinforcement member may include a cross beam along the lateral direction, and two legs extending downward from two ends of the cross beam.

In another embodiment, the cross beam and the two legs may be integrally formed from a hollow tube and are made from steel.

In another embodiment, the metal reinforcement member may have a rectangular cross section.

In another embodiment, the plastic reinforcement member may include a base panel having a middle portion and two wing portions. The middle portion may include an opening defined by two inner vertical edges and an upper lateral edge of the base panel.

In another embodiment, the plastic reinforcement member may include a plurality of ribs protruding from a surface facing the metal reinforcement.

In another embodiment, the plastic reinforcement member may include a plurality of lateral ribs and a plurality of slanted ribs.

In another embodiment, the plastic fascia may include an upper portion and a lower portion, and the upper portion may include a U-shaped cross section to form a cavity open toward a rear of the vehicle.

In another embodiment, the plastic reinforcement member may be configured to have a contour substantially conform to a contour of the plastic fascia.

In another embodiment, the plastic absorber may include a plurality of bands spaced apart at the lateral direction. Each band may include an upper wall, a lower wall and a forward wall to form a U-shape at a cross section perpendicular to the lateral direction, and each band opens toward a rear of the vehicle.

In another embodiment, the plastic absorber may be connected to the plastic reinforcement member and the plurality of bands of the plastic absorber may be received in the cavity of the upper portion of the plastic fascia.

In another embodiment, the vehicle may be a truck having a body-on-frame chassis.

According to another aspect, a bumper system is provided at a front of a vehicle. The bumper system comprises a chassis bumper beam; and a bumper assembly connected to the chassis bumper. The bumper assembly includes a plastic fascia, a plastic reinforcement member, a plastic absorber disposed between the plastic fascia and the plastic reinforcement member, and a metal reinforcement member disposed between the plastic reinforcement member; and the chassis bumper beam.

In one embodiment, the bumper system may further comprise a metal central bracket mounted on a middle portion of the chassis bumper beam, and the metal central bracket is configured to be deflectable at forward-back directions.

In another embodiment, the metal central bracket may include a base and a connection part. The base may include two arms extending forward from a bottom of the chassis bumper beam at a substantially horizontal direction and bending up at a vertical direction and a cross bar connecting the two arms. The connection part may have a first end connected to the chassis bumper beam and a second end connected to a middle portion of the cross bar.

In another embodiment, the base and the connection part may be made from a steel plate.

In another embodiment, the chassis bumper beam may include two wing brackets and may be attached to two end plates of a ladder chassis. The plastic reinforcement member may be attached to the wing brackets and the plastic fascia. The metal reinforcement member may be connected to the two end plates by fasteners passing through the chassis bumper beam, and the plastic fascia is connected to the metal central bracket.

In another embodiment, the plastic reinforcement member may include a base panel having a middle portion and two wing portions. The middle portion may include an opening defined by two inner vertical edges and an upper lateral edge. The metal reinforcement member may include a cross beam along the lateral direction, and two legs extending from two ends of the cross beam, and the two legs of the metal reinforcement member may be disposed adjacent to the vertical edges of the plastic reinforcement member.

In another embodiment, the metal reinforcement member is made from steel.

The bumper assembly and the bumper system of the present application can meet the pedestrian protection performance required by some jurisdictions.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed bumper assembly and bumper system of a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of the bumper assembly and bumper system are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
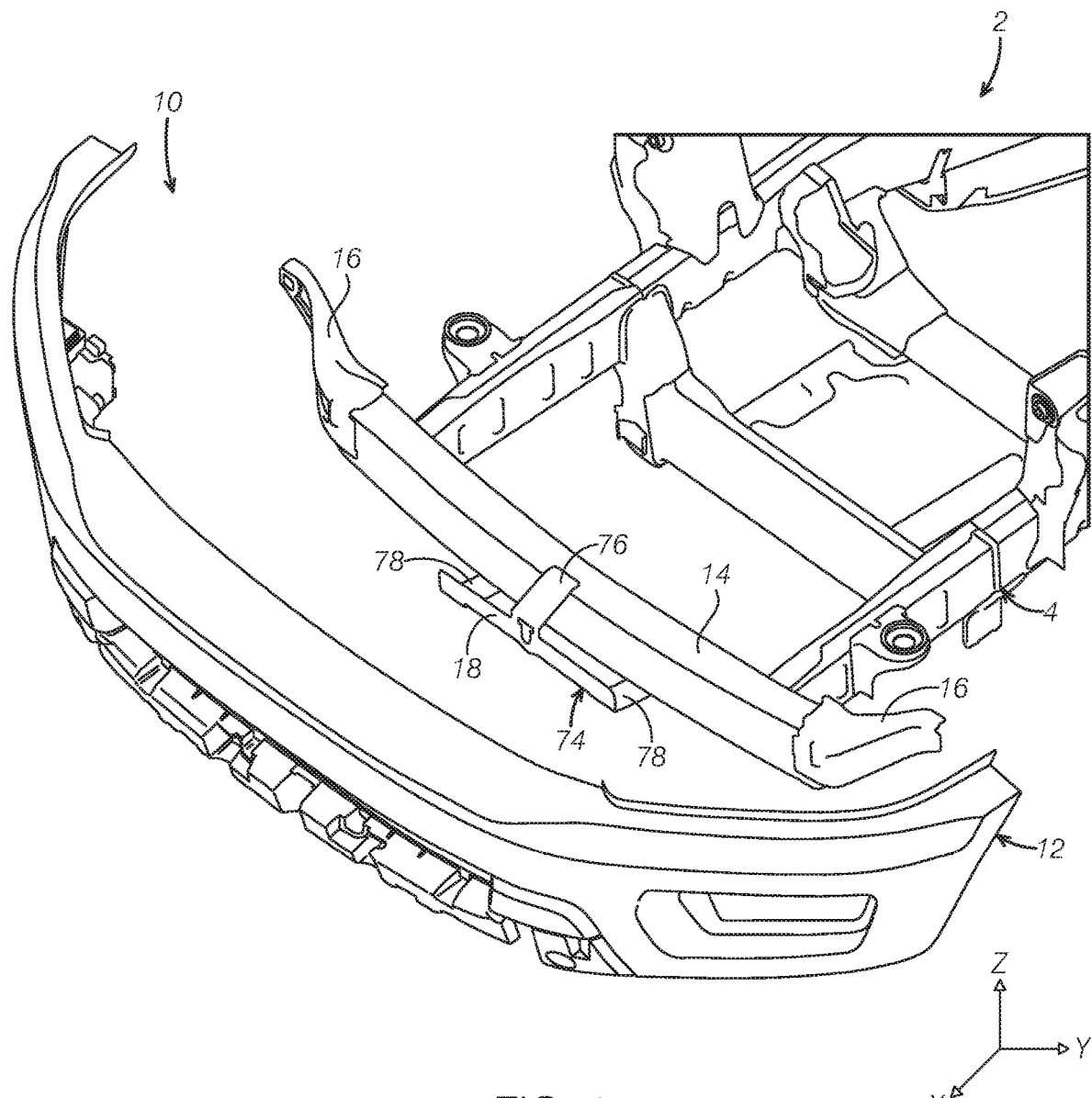
FIG. 1 is a perspective view of a bumper system of a vehicle and a partial view of a chassis of the vehicle according to one embodiment of the present disclosure.
Figure 2:
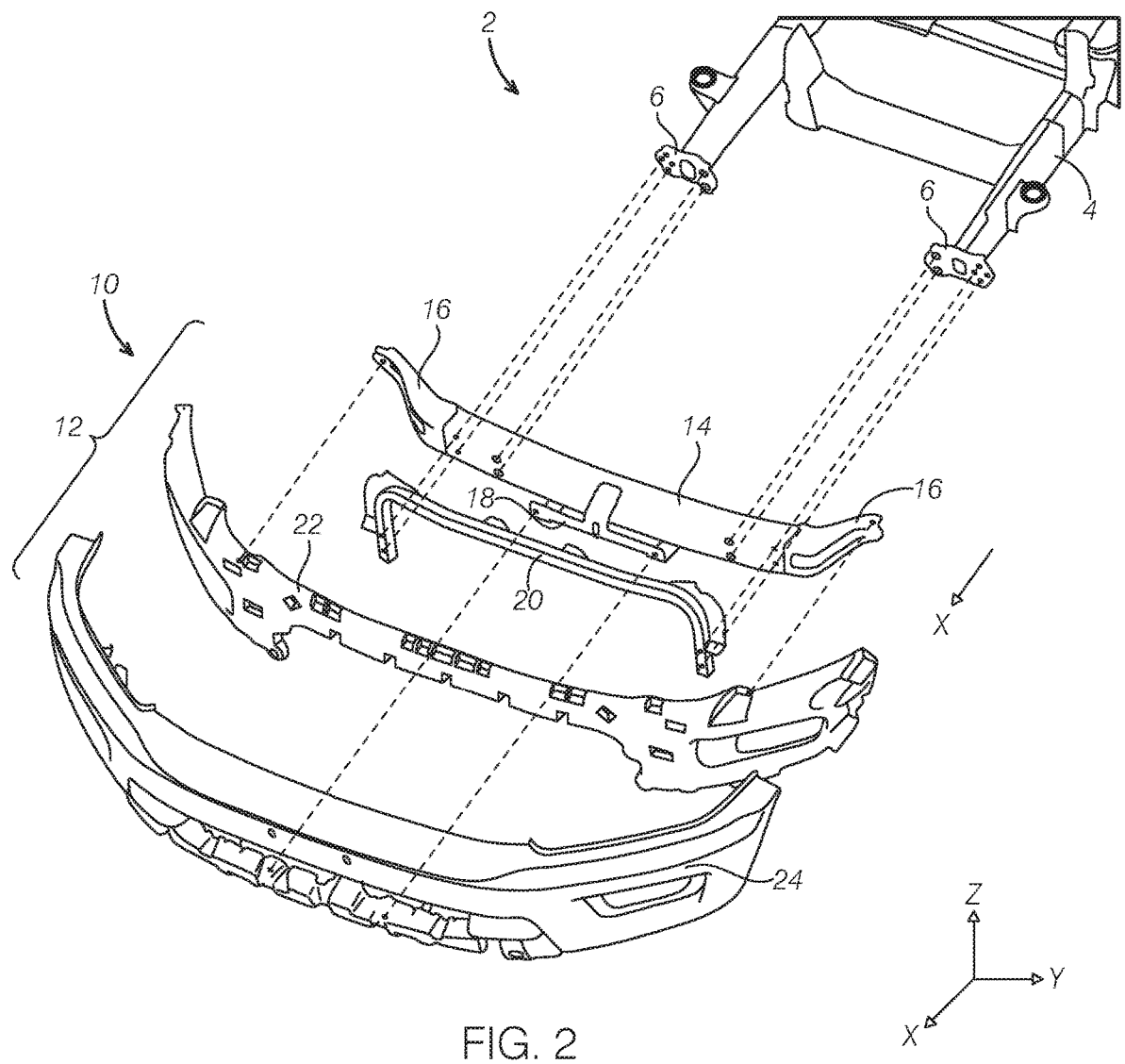
FIG. 2 is an exploded view of a bumper system and a partial view of the chassis in FIG. 1, illustrating connections between the bumper system and the chassis.

Referring to FIGS. 1-2, FIGS. 1-2 are partial exploded views of a front of a vehicle 2, illustrating a bumper system 10 according to one embodiment of the present disclosure. The vehicle 2 may be a truck such as a pick-up truck and has a body-on-frame chassis. The vehicle 2 includes a chassis 4 which may be a body-on-frame chassis. A body of a vehicle (not shown) is mounted on the chassis 4. The chassis 4 includes two chassis end plates 6 at a front of the chassis 4.

The vehicle 2 further includes a bumper system 10 disposed at a front of the vehicle 2. The bumper system 10 may include a bumper assembly 12 and a chassis bumper beam 14. The chassis bumper beam 14 includes a wing bracket 16 at two end portions. The chassis bumper beam 14 and the wing bracket 16 may be made from metal such as steel. In some embodiments, the bumper system 10 may further include a metal central bracket 18 disposed at a middle portion of the vehicle 2 and connected to the chassis bumper beam 14.

The bumper assembly 12 may include a metal reinforcement member 20 and a plastic reinforcement member 22. The metal reinforcement member 20 may be disposed between the plastic reinforcement member 22 and the chassis bumper beam 14. The bumper assembly 12 may further include a plastic fascia 24 disposed at a front of the plastic reinforcement member 22. As shown in FIGS. 1-2, each of the plastic fascia 24, the plastic reinforcement member 22 and the metal reinforcement member 20 extend generally at a lateral direction Y and arranged in an order of plastic fascia 24, the plastic reinforcement member 22 and the metal reinforcement member 20 from a front to a rear at a longitudinal direction X. In some embodiments, the bumper assembly 12 may be preassembled as a module as illustrated in FIG. 3.

FIG. 2 illustrates the example connections between the parts of the bumper assembly 12 and the chassis 4, and the connections are schematically shown in dash lines. In some embodiments, the chassis bumper beam 14 may be attached to the end plate 6 of the chassis 4. Further, the metal reinforcement member 20 may be coupled to the end plate 6 via fasteners passing through the chassis bumper beam 14. For example, fasteners such as bolts may pass through the holes on the metal reinforcement member 20, the chassis bumper beam 14 and the end plate 6 to connect the metal reinforcement member 20 with the chassis bumper beam 14 and the end plate 16. In some embodiments, the plastic reinforcement member 22 may be attached to the wing bracket 16 of the chassis bumper beam 14. In some embodiments, the plastic fascia 24 may be connected to the metal central bracket 18 disposed on the chassis bumper beam 14 via fasteners. For example, the mounts may be formed on the plastic fascia 24 and connected to the metal central bracket 18. The mounts may be made from plastic or any appropriate deflectable materials. Both the mounts and the metal central bracket 18 may deflect to provide stiffness in the height direction Z to support vertical loading but crush and absorb energy in the longitudinal direction X during a pedestrian leg impact.

It should be appreciated that the embodiment in FIG. 2 provides an example connection strategy for the components in the bumper system 10. It should be appreciated that the components of the bumper system may be connected by other connection strategies.

Figure 3:
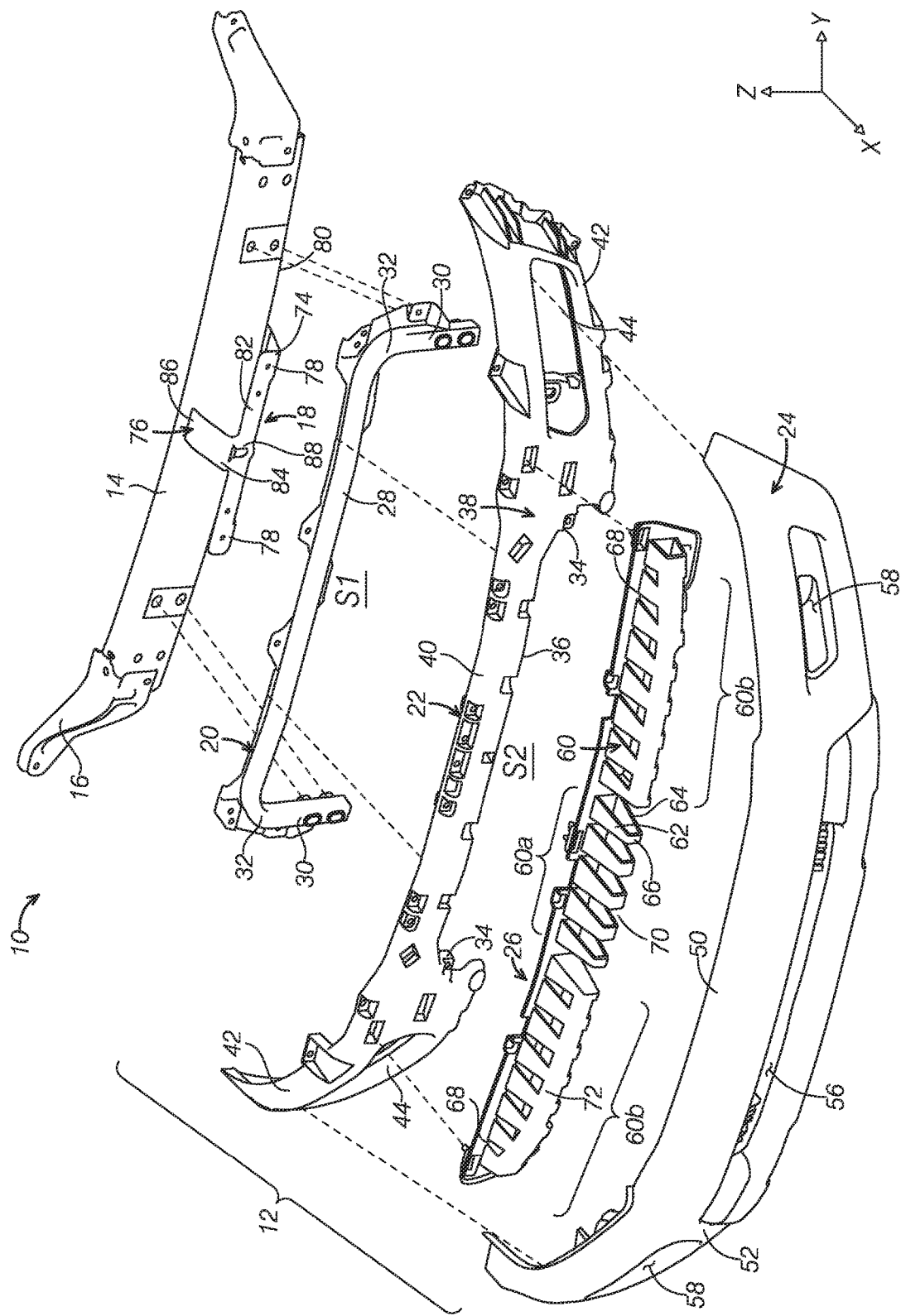
FIG. 3 is an exploded view of a bumper system in FIG. 2

Referring to FIG. 3, the bumper assembly 12 may further include an absorber 26 disposed between the plastic fascia 24 and the plastic reinforcement member 22. The chassis bumper beam 14, the metal central bracket 18, the metal reinforcement member 20 and the plastic reinforcement member 22, the absorber 26 and the plastic fascia 24 are generally disposed along the lateral direction Y and selectively connected at a longitudinal direction X. In some embodiments, the plastic fascia 24, the absorber 26, the plastic reinforcement member 22 and the metal reinforcement member 20 may be preassembled as a module. For example, the absorber 26 may be connected to the plastic reinforcement member 22 while the plastic reinforcement member 22 may be connected to the plastic fascia 24 to form a soft element for pedestrian protection. Further, the metal reinforcement member 20 is connected to the plastic reinforcement member 22 such that the bumper assembly as a preassembled module is formed. The chassis bumper beam 14 and the plastic reinforcement member 22 form a solid element for required rigidity or stiffness and crash performance.

Figure 4:
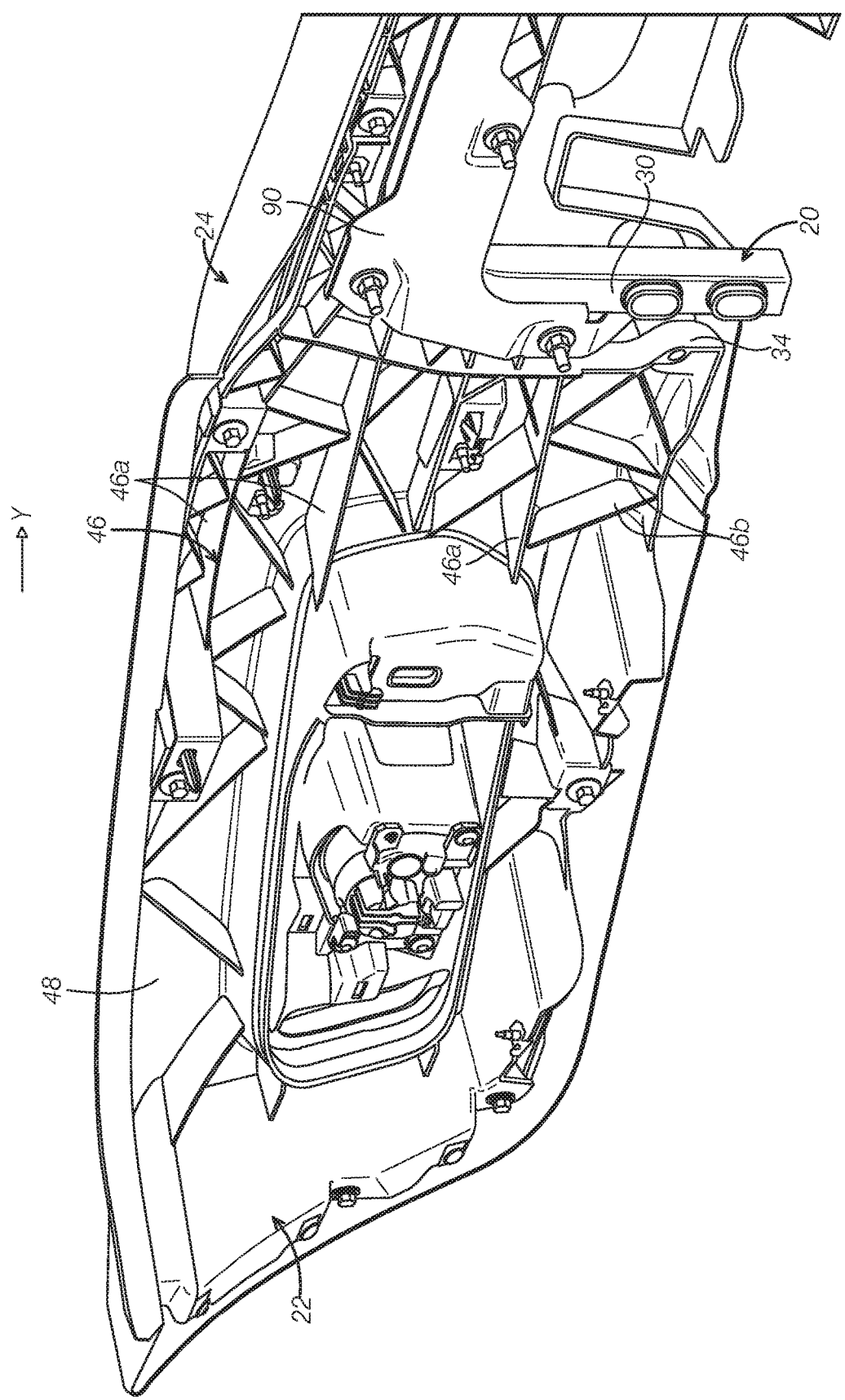
FIG. 4 is a partial view of the bumper system in FIG. 2.
Figure 5:
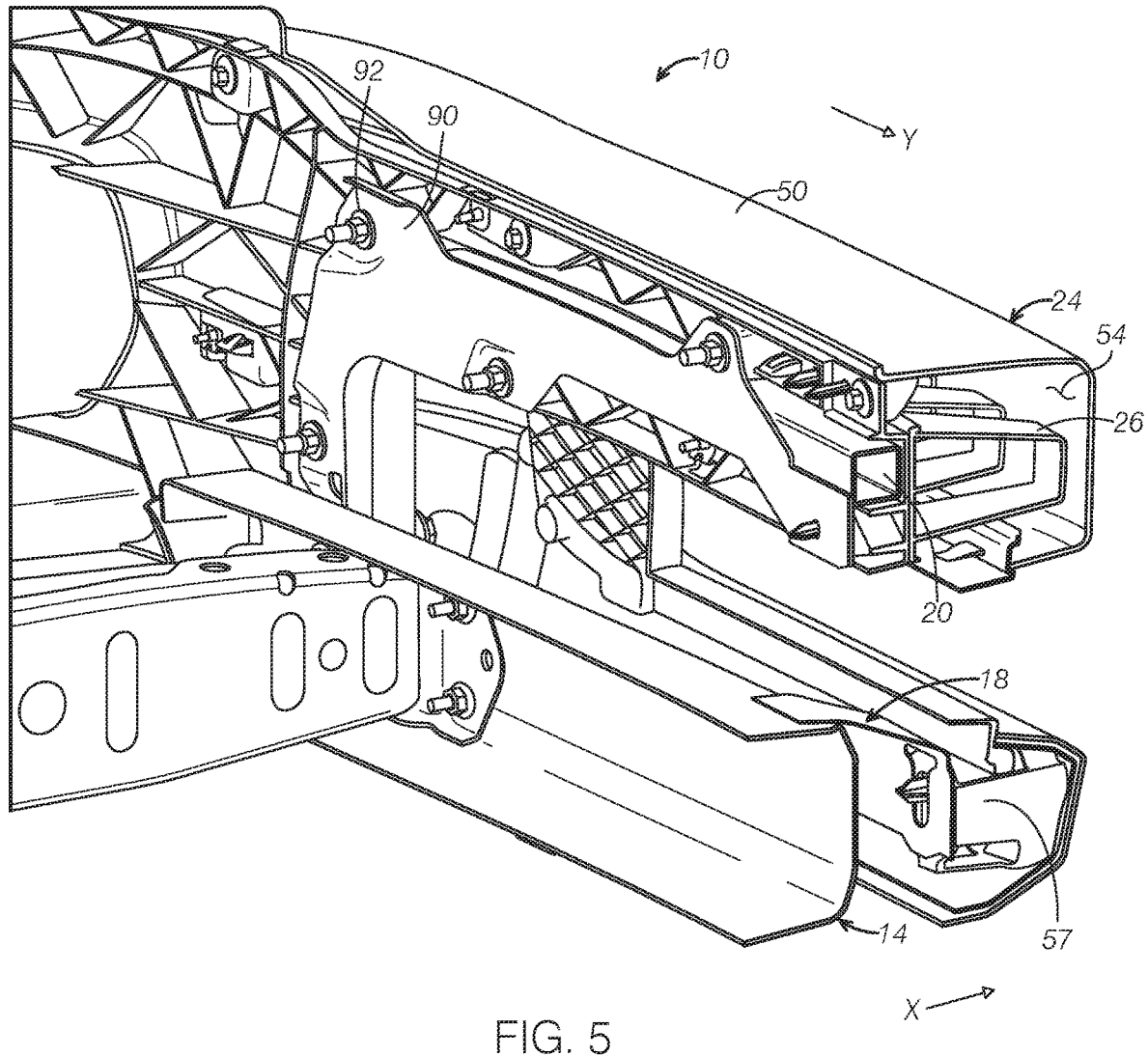
FIG. 5 is a partial view of the bumper system in FIG. 2 and a partial view of a chassis.

Continuing with FIGS. 2-3 and with further reference to FIGS. 4-5, the metal reinforcement member 20 may include a cross beam 28 along the lateral direction Y, and two legs 30 extending downward from two ends 32 of the cross beam 28. In the depicted embodiment, the two legs 30 are configured to correspond the chassis end plates 6 at an assembled position such that the metal reinforcement member 20 can be connected to the chassis end plates 6 of the chassis 4. Further, the legs 30 may be disposed to be adjacent to the inner vertical edges 34 of the plastic reinforcement member 22 at the assembled position as shown in FIG. 4. In some embodiments, the metal reinforcement member 20 may be received in the ribs formed on the plastic reinforcement member 22. An opening S1 defined by the metal reinforcement member 20 may correspond to an opening S2 defined by the inner vertical edge 34 and an inner lateral edge 36 of the plastic reinforcement member 22. The cross beam 28 and the legs 30 of the metal reinforcement member 20 may be a hollow tube and integrally formed. In the depicted embodiment, a cross section of the metal reinforcement member has a square shape. It should be appreciated that the cross section of the metal reinforcement member 20 may have any appropriate shapes such as a rectangle, a circle, an oval or a polygon. In some embodiments, the metal reinforcement member 20 may be made from steel. A steel has high strength and thus the metal reinforcement member made from a steel tube may have a minimal tube dimension compared to other metals. Further, the steel reinforcement member enables easy metal inert gas (MIG) welding to join the parts together. It should be appreciated that the metal reinforcement member 20 may be made from other metal such as aluminum.

Referring to FIG. 3 and with further reference to FIGS. 2 and 4, the plastic reinforcement member 22 may include a base panel 38 having a middle portion 40 and two wing portions 42. The middle portion 40 includes an opening S2 defined by the inner vertical edge 34 and the upper lateral edge 36. Each of the wing portion 42 may include an opening 44 to accommodate the structural or styling components or receive vehicle parts such as lightening devices. Referring to FIG. 4, the plastic reinforcement member 22 may include a plurality of ribs 46 protruding from a rear surface 48 and facing the metal reinforcement member 20 or the chassis bumper beam 14. In some embodiments, the ribs 46 may be substantially perpendicular to the rear surface 48. The ribs 46 may include a plurality of lateral ribs 46a extending along the lateral direction Y and a plurality of slanted ribs 46b. The slanted ribs 46b may be inclined to different directions. Some of the ribs 46 may form grids and some of the ribs 46 may form a channel to receive the cross beam 28 of the metal reinforcement member 20. The base panel 38 and the plurality of ribs 46 may be integrally informed in an injection molding process. The ribs 46 are configured to provide required stiffness to the plastic reinforcement member 22 and support the plastic fascia 24. As shown in FIGS. 2-4, the plastic reinforcement member 22 has a contour substantially conform to a contour of the plastic fascia 24. In the depicted embodiment, the plastic reinforcement member 22 is connected to the plastic facia 24 via bolts/nuts at a plurality of points to support the plastic facia and provide sufficient stiffness. It should be appreciated that the plastic reinforcement member 22 may be connected with the plastic fascia 24 via any appropriate approaches.

Referring to FIGS. 3 and 5, the plastic fascia 24 may include an upper portion 50 and a lower portion 52. The upper portion 50 may include a U-shaped cross section to form a cavity 54 open toward a rear of the vehicle. The lower portion 52 may include a central aperture 56 to expose grille or for styling purpose and openings 58 at the two sides to accommodate the vehicle parts such as lighting devices. Referring to FIG. 5, the plastic fascia 24 may further include a mount 57 connected to the metal central bracket 18. In some embodiments, the mount 57 may be made from plastic and include crush features such as notches to achieve the required deflection characteristics. The mount 57 together with the metal central bracket 18 deflects to provide stiffness in a height direction Z to support vertical loading but crush and absorb energy in longitudinal direction X during a pedestrian leg impact.

Continuing with FIGS. 3 and 5, the absorber 26 may include a plurality of bands 60 spaced apart at the lateral direction Y. Each band 60 comprises an upper wall 62, a lower wall 64 and a forward wall 66 to form a U-shape at a cross section perpendicular to the lateral direction Y. In the depicted embodiment, the plurality of bands 60 includes a first plurality of bands 60a disposed at a middle portion 70 and a second plurality of bands 60b disposed at two side portions 68. A strap 72 is disposed on the forward walls 66 of the second plurality of bands 60b to connect the second bands 60b at a front of the absorber 26 along the lateral direction Y. The forward walls 66 of the first plurality of band 60a are separate each other at the front end. The absorber 26 is configured to be deformable such as being buckled during a pedestrian collision to absorb the energy of the impact. The absorber 26 is further configured to counteract variability in frontal stiffness due to a front bumper styling while meeting the requirement for the energy absorption. The absorber 26 may be made from plastic material.

Figure 6:
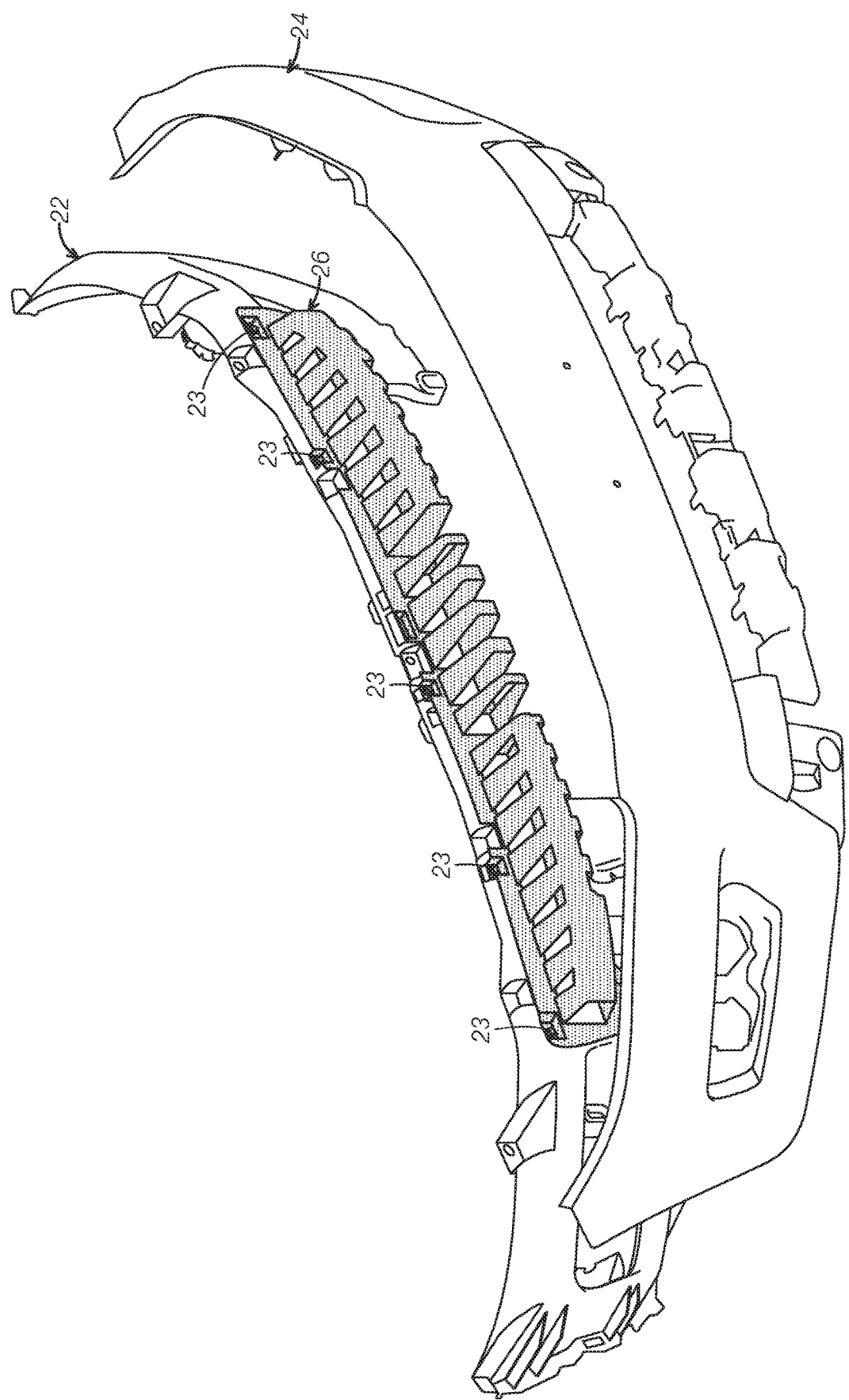
FIG. 6 is a perspective view of a bumper assembly according to one embodiment of the present disclosure.

In some embodiments, the absorber 26 may be received in the cavity 54 formed in the plastic fascia 24 as shown in FIG. 5. The absorber 26 may be attached to the plastic reinforcement member 22 by any appropriate approaches. FIG. 6 shows that the absorber 26 is connected to the plastic reinforcement member 22 via a plurality of fasteners such as bolts/nuts 23.

Referring to FIGS. 1 and 3, the bumper system 10 includes a metal central bracket 18 attached to the chassis mount beam 14. The metal central bracket 18 is configured to provide stiffness in a vertical direction Z and deflectable at a longitudinal direction X to absorb the energy during a pedestrian leg impact. In some embodiments, the metal central bracket 18 may include a base 74 and a connection part 76. In the depicted embodiment, the base 74 includes two arms 78 extending forward from a bottom 80 of the chassis mount beam 14 at a substantially longitudinal direction X and bending up at the vertical direction Z and a cross bar 82 connecting the two arms 78. The connection part 76 may be a plate having a first end 84 and a second end 86. The first end 84 is connected to a middle portion 88 of the cross bar 82 and the second end 86 is connected to the chassis mount beam 14. In some embodiments, the metal central bracket 18 may be made from steel and may be integrally formed. It should be appreciated that the metal central bracket 18 may have any appropriate configuration that provides stiffness in the vertical direction Z while deflectable to absorb energy at the longitudinal direction X during a front impact.

Referring to FIG. 5, the bumper system 10 may further include a support structure 90 disposed at a rear of the metal reinforcement member 20. The support structure 90 may have a shape corresponding to a shape of the metal reinforcement member 20 and may be connected to the plastic reinforcement member 22 via a plurality of fasteners 92 such as bolts/nuts. The support structure 90 may be made from metal such as steel. The support structure 90 adds stiffness to the bumper assembly 12.

The bumper system 10 is configured to achieve resonant frequency targets via the combination of one of the ribbed plastic reinforcement member 22, the metal reinforcement member 20, the metal central bracket 18 and the wing brackets 16. In some embodiments, the resonant frequency may refer to the first natural frequency of the complete bumper system 10. The first natural frequency is a measure of the lowest dynamic stiffness of the bumper system 10. The bumper system needs to have a certain level of dynamic stiffness such that it does not get into resonance from the expected uneven road surface inputs coming through the front suspension. The bumper system of the present disclosure can achieve a dynamic stiffness with its first natural frequency being higher than all expected road surface frequencies through the vehicle suspension. Further, the bumper system of the present disclosure can meet pedestrian safety performance by incorporating one of the plastic reinforcement member, the metal reinforcement member, the absorber and the metal central bracket.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A bumper assembly to be connected to a chassis bumper beam at a front of a vehicle, comprising:
   a plastic fascia;
   a metal reinforcement member, wherein the metal reinforcement member includes a cross beam along a lateral direction of the vehicle, and two legs extending downward from two ends of the cross beam;
   a plastic reinforcement member disposed between the plastic fascia and the metal reinforcement member and connected with the plastic fascia and the metal reinforcement member; and
   a plastic absorber disposed between the plastic fascia and the plastic reinforcement member, wherein the plastic absorber is connected to the plastic reinforcement member;
   wherein the plastic fascia, the plastic reinforcement member and the metal reinforcement member extend at the lateral direction of the vehicle.

2. The bumper assembly of claim 1, wherein the cross beam and the two legs are integrally formed from a hollow tube and are made from steel.

3. The bumper assembly of claim 2, wherein the metal reinforcement member has a rectangular cross section.

4. The bumper assembly of claim 2, wherein the plastic reinforcement member includes a base panel having a middle portion and two wing portions, wherein the middle portion includes an opening defined by two inner vertical edges and an upper lateral edge of the base panel.

5. The bumper assembly of claim 4, wherein the plastic reinforcement member includes a plurality of ribs protruding from a surface facing the metal reinforcement member.

6. The bumper assembly of claim 5, wherein the plastic reinforcement member includes a plurality of lateral ribs and a plurality of slanted ribs.

7. The bumper assembly of claim 1, wherein the plastic fascia includes an upper portion and a lower portion, wherein the upper portion include a U-shaped cross section to form a cavity open toward a rear of the vehicle.

8. The bumper assembly of claim 7, wherein the plastic reinforcement member is configured to have a contour substantially conform to a contour of the plastic fascia.

9. The bumper assembly of claim 8, wherein the plastic absorber includes a plurality of bands spaced apart at the lateral direction, wherein each band includes an upper wall, a lower wall and a forward wall to form a U-shape at a cross section perpendicular to the lateral direction, and wherein each band opens toward a rear of the vehicle.

10. The bumper assembly of claim 9, wherein the plastic absorber is connected to the plastic reinforcement member and wherein the plurality of bands of the plastic absorber are received in the cavity of the upper portion of the plastic fascia.

11. The bumper assembly of claim 1, wherein the vehicle is a truck having a ladder chassis.

12. A bumper system at a front of a vehicle, comprising:
   a chassis bumper beam;
   a bumper assembly connected to the chassis bumper beam, including:
      a plastic fascia,
      a plastic reinforcement member,
      a plastic absorber disposed between the plastic fascia and the plastic reinforcement member, and a metal reinforcement member disposed between the plastic reinforcement member and the chassis bumper beam.

13. The bumper system of claim 12, further comprising a metal central bracket mounted on a middle portion of the chassis bumper beam, wherein the metal central bracket is configured to support up-down movement and deflectable forward-back.

14. The bumper system of claim 13, wherein the metal central bracket includes a base and a connection part, wherein the base includes two arms extending forward from a bottom of the chassis bumper beam at a substantially horizontal direction and bending up at a vertical direction and a cross bar connecting the two arms, and wherein the connection part having a first end connected to the chassis bumper beam and a second end connected to a middle portion of the cross bar.

15. The bumper system of claim 14, wherein the base and the connection part of the metal central bracket are made from a steel plate.

16. The bumper system of claim 13, wherein the chassis bumper beam includes two wing brackets and is attached to two end plates of a ladder chassis, wherein the plastic reinforcement member is attached to the wing brackets and the plastic fascia, wherein the metal reinforcement member is connected to the two end plates by fasteners passing through the chassis bumper beam, and wherein the plastic fascia is connected to the metal central bracket.

17. The bumper system of claim 14, wherein the plastic reinforcement member includes a base panel having a middle portion and two wing portions, wherein the middle portion includes an opening defined by two inner vertical edges and an upper lateral edge, wherein the metal reinforcement member includes a cross beam along a lateral direction, and two legs extending from two ends of the cross beam, and wherein the two legs of the metal reinforcement member is disposed adjacent to the inner vertical edges of the plastic reinforcement member.

18. The bumper system of claim 12, wherein the metal reinforcement member is made from steel.

* * * * *